(12) United States Patent
Dobrovolskiy et al.

(10) Patent No.: US 7,647,589 B1
(45) Date of Patent: Jan. 12, 2010

(54) METHODS AND SYSTEMS FOR SAFE EXECUTION OF GUEST CODE IN VIRTUAL MACHINE CONTEXT

(75) Inventors: Nikolay N. Dobrovolskiy, Moscow (RU); Andrey A. Omelyanchuk, Moscow (RU); Alexander G. Tormasov, Moscow (RU); Stanislav S. Protassov, Singapore (SG); Serguei M. Beloussov, Singapore (SG)

(73) Assignee: Parallels Software International, Inc., Tortola (VG)

( * ) Notice: Subject to any disclaimer, the term of this patent is extended or adjusted under 35 U.S.C. 154(b) by 1101 days.

(21) Appl. No.: 11/139,787

(22) Filed: May 31, 2005

Related U.S. Application Data

(60) Provisional application No. 60/650,135, filed on Feb. 7, 2005.

(51) Int. Cl.
G06F 9/455 (2006.01)
G06F 13/24 (2006.01)
G06F 11/00 (2006.01)
G06F 9/44 (2006.01)

(52) U.S. Cl. .............. 718/1; 710/260; 714/38; 717/129

(58) Field of Classification Search ........... 711/6, 711/163; 717/134, 131, 138, 129; 718/1, 718/100; 714/38; 710/260
See application file for complete search history.

(56) References Cited

U.S. PATENT DOCUMENTS

| | | | |
|---|---|---|---|
| 4,253,145 A | | 2/1981 | Goldberg |
| 5,504,922 A | * | 4/1996 | Seki et al. ............... 703/25 |
| 5,579,520 A | * | 11/1996 | Bennett ............... 717/151 |
| 6,397,242 B1 | * | 5/2002 | Devine et al. ........... 718/1 |
| 6,496,847 B1 | * | 12/2002 | Bugnion et al. ........... 718/1 |
| 6,704,925 B1 | | 3/2004 | Bugnion |
| 6,711,672 B1 | | 3/2004 | Agesen |
| 6,725,289 B1 | | 4/2004 | Waldspurger et al. |
| 6,735,601 B1 | | 5/2004 | Subrahmanyam |
| 6,785,886 B1 | | 8/2004 | Lim et al. |
| 6,789,156 B1 | | 9/2004 | Waldspurger |
| 6,795,966 B1 | * | 9/2004 | Lim et al. ............... 718/1 |
| 6,880,022 B1 | | 4/2005 | Waldspurger et al. |
| 6,895,491 B2 | * | 5/2005 | Kjos et al. ............... 711/203 |
| 6,944,699 B1 | | 9/2005 | Bugnion et al. |
| 6,961,806 B1 | | 11/2005 | Agesen et al. |
| 6,961,941 B1 | | 11/2005 | Nelson et al. |

(Continued)

OTHER PUBLICATIONS

Barham, P., et al., "Xen and the Art of Visualization," University of Cambridge Computer Laboratory, Cambridge UK, pp. 1-14 (2003).

(Continued)

*Primary Examiner*—Meng-Ai An
*Assistant Examiner*—Tammy Lee
(74) *Attorney, Agent, or Firm*—Bardmesser Law Group

(57) ABSTRACT

Methods and systems for safe execution of guest code in virtual machine context are presented. A method for running a virtual machine in a computing system includes (a) launching a virtual machine monitor (VMM) that uses a software debugger; (b) launching a virtual machine (VM) that can natively run safe instructions; (c) determining, at runtime, if the instruction is safe or potentially unsafe; (d) executing safe instructions in a native mode; and (e) activating control logic to process potentially unsafe instructions in the software debugger. The software debugger can bypass at least one of the potentially unsafe instructions. The potentially unsafe instructions include instructions that cannot be safely executed in the context of the VM, and instructions that can cause unpredictable results in the context of the VM.

43 Claims, 8 Drawing Sheets

| | | | |
|---|---|---|---|
| 6,996,748 B2* | 2/2006 | Uhlig et al. | 714/38 |
| 7,069,413 B1* | 6/2006 | Agesen et al. | 711/207 |
| 7,124,327 B2* | 10/2006 | Bennett et al. | 714/38 |
| 7,131,114 B2* | 10/2006 | Nguyen et al. | 717/129 |
| 7,237,051 B2* | 6/2007 | Bennett et al. | 710/260 |
| 7,272,831 B2* | 9/2007 | Cota-Robles et al. | 718/1 |
| 7,412,702 B1* | 8/2008 | Nelson et al. | 718/1 |
| 7,555,592 B1* | 6/2009 | Koryakin et al. | 711/6 |
| 2005/0080753 A1* | 4/2005 | Vega et al. | 706/21 |
| 2005/0081199 A1* | 4/2005 | Traut | 718/1 |

OTHER PUBLICATIONS

Fraser, K., et al., "Reconstructing I/O," University of Cambridge, Technical Report 596:1-16 (2004).

Fraser, K., et al., "Safe Hardware Access with the Xen Virtual Machine Monitor," University of Cambridge Computer Laboratory, pp. 1-10.

* cited by examiner

METHODS AND SYSTEMS FOR SAFE EXECUTION OF GUEST CODE IN VIRTUAL MACHINE CONTEXT

CROSS-REFERENCE TO RELATED APPLICATIONS

U.S. Provisional Patent Application No. 60/650,135, entitled SYSTEM AND METHOD FOR STARTING VIRTUAL MACHINE MONITOR IN COMMON WITH ALREADY INSTALLED HOST OPERATING SYSTEM, Inventors: OMELYANCHUK et al., Filed: Feb. 7, 2005, is incorporated by reference herein in its entirety.

BACKGROUND OF THE INVENTION

1. Field of the Invention

The present invention relates generally to Virtual Machine (VM) technology and, more particularly, to methods and systems for safe execution of guest code in a VM context.

2. Background Art

With VM technology, a user can create and run multiple operating environments on a computer at the same time. Each operating environment, or virtual machine, requires its own operating system (OS) and can run applications independently. The VM software provides a layer between the hardware of the computing system and the software that runs on it.

Frequently, the problem arises of simultaneously running different operating systems on the same hardware system. For example, with one version of MICROSOFT WINDOWS running on the computing system, it can be necessary to start another instance or another version of WINDOWS or another operating system on the same hardware system.

A typical VMM enables a single physical machine or processor to act as if it were several physical machines. A VMM, typically jointly with a high-ranking OS (although there are VMMs that can be executed on bare hardware, without a high-ranking OS), can run a number of different operating systems simultaneously, such that each of the different operating systems has its own VM. In other words, a typical VMM can handle a number of VMs, each of which represents its own OS, and each of which can run its own application software and control or use its own hardware (if any), including certain types of processors, I/O and data storage devices, and so on, as if they were running on a single processor. The high-ranking OS is typically referred to as a "host OS" (HOS). The multiple operating systems that are running as VMs are typically referred to as "guest operating systems" ("guest OSs") running "guest code."

A conventional approach for implementing VMs includes a VMM approach developed by IBM and implemented on mainframes, which support virtualization. Another approach includes implementing VMM on modern processors, which do not support the hardware virtualization, such as full step-by-step or page-by-page interpretation of the original code, or full binary translation of the original code, or combining binary translation of some portions of the original code and direct execution of other portions of the original code.

One conventional VMM approach is based on direct execution of the guest OS code with reduced privileges (for example, the IBM VMJ370 approach). It is very efficient, but cannot be easily implemented on modern computers due to a lack of necessary architectural features. A second conventional approach is based on binary translation (together with direct execution) of the guest source code. This approach can be implemented on modern computers, but has a number of significant disadvantages, for example, due to a necessity to translate not only the source code, which cannot be executed in the environment of the VM, but also the linked fragments of the source code, that cannot be executed due to a change in a size of the fragments and a corresponding change or shift in local addresses. In other words, when binary translation is used, the length of the translated code increases, which changes the length of the entire fragment of the code. Accordingly, a need arises to track changes in the address labels in the entire fragment of the original code. Additionally, the binary translation approach increases the difficulty of processing translated pages of code, because the shift in local addresses makes maintaining the validity of the translated code in the cache more difficult with changes in the original code of the guest OS (e.g., in the case of self-modifying code).

Accordingly, what is needed are methods and systems for safe execution of guest code in a VM context with minimal modification of code required for safe execution.

BRIEF SUMMARY OF THE INVENTION

The present invention is directed to methods and systems for safe execution of guest code inside a Virtual Machine that substantially obviates one or more of the problems and disadvantages of the related art.

In one embodiment, a method for running a virtual machine in a computing system includes (a) launching a virtual machine monitor (VMM) that uses a software debugger; (b) launching a virtual machine (VM) that can natively run safe instructions; (c) determining, at runtime, if the instruction is safe or potentially unsafe; (d) executing safe instructions in a native mode; and (e) activating control logic to process potentially unsafe instructions in the software debugger. The software debugger can bypass at least one of the potentially unsafe instructions. The potentially unsafe instructions include instructions that cannot be safely executed in the context of the VM, and instructions that can cause unpredictable results in the context of the VM.

In another aspect, the method further includes bypassing at least one potentially unsafe instruction. In another aspect, the method further includes generating bypassing code for the at least one potentially unsafe instruction; and executing the bypassing code.

Additional features and advantages of the invention will be set forth in the description that follows. Yet further features and advantages will be apparent to a person skilled in the art based on the description set forth herein or can be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
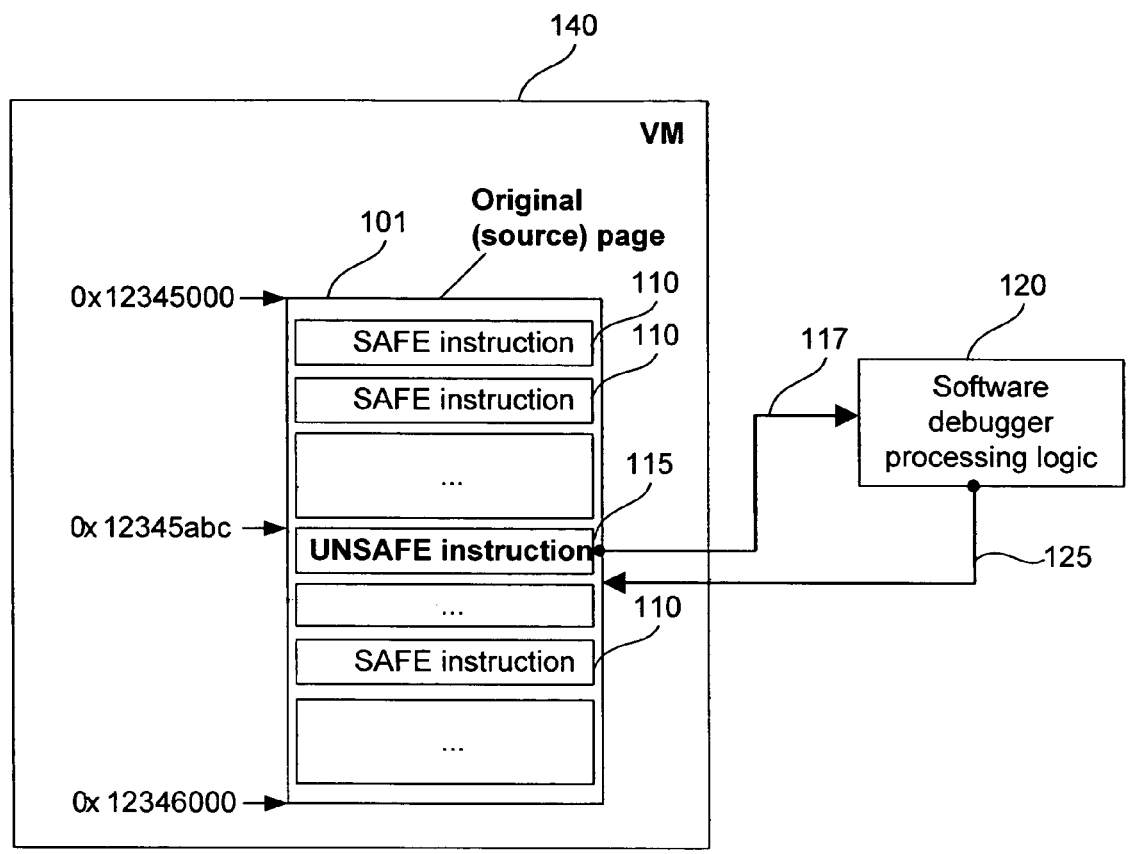
FIG. 1 illustrates an example technique using a software debugger for safe execution of guest code in a VM, where original guest code is directly executed.

Reference will now be made in detail to the embodiments of the present invention, examples of which are illustrated in the accompanying drawings.

Overview

The techniques described herein provide an effective procedure for realization of a VM designed for execution of user instructions and instructions of the VM's OS (usually referred to as "guest OS"). Types of instructions that can be singled out in the software codes to be executed in the VM include "safe instructions" and "unsafe instructions." Additionally, some kinds of instructions can be singled out in the software codes if the instructions themselves are safe, but the code sequences are unsafe. Safe instructions are instructions that produce the results expected by the guest OS when executed in the VM. Unsafe instructions are instructions that produce results different from those expected by the guest OS when executed in the VM, or that are unsafe from the viewpoint of the VMM or HOS. Additionally, some instructions can be either safe or unsafe instructions, depending on the context of their execution (including the VM context). As used herein, the term "VM context" refers to circumstances under which a computing system is used. The context settings may include hardware processor registers settings, which define instructions being executed by the hardware processor. Also, context settings may include system libraries being accessed by applications, mapped memory pages, settings of the hardware being emulated in the VM and so on.

Depending on the configuration of the hardware of the computing system, examples of unsafe instructions include the following: reading of some of the system registers of the processor, writing to them, attempting to directly access certain input-output (I/O) devices, attempting to access the system areas of the host OS, and attempting to execute other instructions that cannot be operated in the VM mode or that can lead to a system operation failure. In general, unsafe instructions are instructions that could not be executed in an expected manner or that might corrupt other contexts.

Using a Virtual Machine Monitor (VMM) to Safely Execute Guest Code

In one embodiment, a VMM is used to control execution of guest instructions or instructions associated with a VM. Also, the VMM can be used to control sharing of system resources, including scheduling processes. Since the VMM must monitor and control execution of the instructions running inside the VM, some of the VMs can use their own instance of the VMM.

The VMM described herein can effectively operate with existing hardware virtualization technologies, such as INTEL VMX technology, including Vanderpool Technology for IA-32 Processors (VT-x) and Vanderpool Technology for INTEL Itanium Architecture (VT-i). The IA-32 INTEL Architecture Software Developer's Manuals, Volumes 1-3, see http://www.intel.com/design/pentium4/manuals/index_new.htm#1, and the INTEL Itanium Architecture Software Developer's Manuals, Volumes 1-3, see http://www.intel.com/design/itanium2/documentation.htm#manuals, which are incorporated herein by reference in their entireties, provide detailed discussions of the INTEL VMX technology. Also, other technologies, processors and chipsets from other manufacturers, e.g., IBM Power 5 and Cell processor technologies, AMD PACIFICA technology, NVIDIA, MOTOROLA and so on can support the VMM approach described herein.

Depending on how the system hardware is configured, the VMM can emulate, ignore or forbid execution of particular instructions, as well as particular sequences of instructions, within the VMs. Sets of instructions that should be emulated, executed, or forbidden can be different for the VMM and the VMs. For example, when using the INTEL VMX technology, selecting a set of allowed instructions and enabling safe switching of context can be done, at least particularly at the hardware level, by appropriate commands, or by changing flags in appropriate processor registers (e.g., VM ENTRY, VM EXIT, VM ON and VM OFF for processing by the VMs, and VT ON and VT OFF for entering or exiting VM processing mode).

In the INTEL family of processors, various "privilege levels" are different modes of operation characterized, e.g., by different sets of available instructions and accessed registers. Privilege levels may be set through appropriate processor registers. In the INTEL IA-32 architecture, Ring 0 and Ring 3 privilege levels can be used to implement the VMM approach described herein. Although particular examples described herein relate to the INTEL architecture, the approach described herein is not limited to the INTEL architecture, and can be implemented with other processor families and processor architectures.

Furthermore, context switching processes can be distributed between the HOS, the VMM and the guest OS.

The VMM approach described herein is highly scalable and easy to configure for virtualization of computing systems even inside a non-native hardware system. This advantage is achieved by separating the processes of analyzing and executing different types of instructions and also by performing direct and non-direct execution of instructions in different modes and settings of the system hardware.

Also, the VMM approach described herein can be used for full emulation of hardware systems that are incompatible with the executed software. However, the execution of instructions that are at least partially compatible with the hardware system is typically preferred.

The VMM described herein can be configured to include at least one (or possibly all) of the following characteristics: (1) the VMM has system-level privileges, for example, Ring 0 privileges for the INTEL IA-32 architecture, or "root" for the VT-X architecture; (2) the VMM can launch any number of VMs, some of which can have all or some system-level privileges; (3) the VMs have no or have reduced direct access to input/output devices; and (4) the VMM emulates virtual I/O devices for the guest operating systems running with the support of the VM.

Note that I/O devices can include, e.g., keyboards, printers, server I/O ports, network I/O devices, control registers of dedicated processors and privileged areas of memory, which are specifically designed for exchange of data between devices and storage of system level information (for example, for storage of data relating to I/O device function and control), etc.

Techniques for Safe Execution of Guest Code in the VM Context

In one embodiment, techniques analogous to software debugging techniques for controlling execution of software code are used to avoid direct execution of unsafe or potentially unsafe guest code.

Different software debugging techniques, used for executing software under debugger control, are known in the art. For example, U.S. Pat. No. 6,848,097 describes a software debugger that can be implemented for safe software execution. Other examples of software debuggers include the GNU Project Debugger (GDB), MICROSOFT Visual Studio™, and MICROSOFT WinDbg, among others.

A typical software program includes data and functions that operate on the data. The source code of the functions is compiled into an object code file. The object code file contains instructions that can be loaded into a computer memory for execution. After being loaded into the computer memory, the bits of the instructions are referred to as a "program image." A software debugger is typically used to examine the program image of a program during execution. Predefined sets of instructions characterized by addresses, by opcodes or by names of procedures are intercepted by the software debugger using breakpoints. The software debugging techniques described herein can be used to examine either the program image or its object file.

In one approach, a software debugger can be used to set up breakpoints or interrupts forcing the processor to raise exceptions (e.g., to prevent illegal access to memory or to input/output devices). Optionally, instructions that cause the processor to raise exceptions can be used as breakpoints.

Some or all of the breakpoints can be set up through binary substitution of original opcodes for one-byte and multiple-byte instructions in the original code. Such interrupts include, for example, INT1, INT3 or INT(n) for the INTEL IA-32 architecture, and similar interrupts or opcodes used in other system architectures.

In another approach, a software debugger can be used to determine the location of an unsafe instruction by examining program information either in image or in object mode. If the location of the unsafe instruction or unsafe set of instructions is determined, the software debugger inserts an interrupt (e.g., INT3) in the breakpoint. Subsequently, the program code having the interrupts inserted can be executed in the native mode without requiring additional control mechanisms to raise exceptions at the breakpoints.

According to another approach, some unsafe instructions can cause breakpoints without using a software debugger to insert interrupts. For example, an exception will be triggered when control is transferred to a page that has not been analyzed by the software debugger and is not mapped as "present." In this case, control can be transferred to the software debugger for subsequent page processing by additional mechanisms, such as by an exception handler. In other words, if the operation mode of the hardware processor already provides for entering the software debugger during an attempt to execute unsafe instructions in the VM context, then the executable code need not be previously analyzed.

The software debugging techniques described herein are implemented so that execution of different instruction sets in different modes of operation of the hardware processor and/or associated hardware logic, such as chipset logic, is permitted. Thus, implementation of the software debugging techniques may not be affected even if different types of processors that allow multiple modes of operations are used.

If processors are used that permit various modes of execution for instructions, then entering the software debugger can be implemented, for example, by raising interrupts if an instruction for execution is forbidden in a particular mode of operation. An ideal way is to provide full required hardware support. In this case, the code analysis procedure needs to be implemented only on a hardware level.

One example hardware implementation is the INTEL VMX technology. If processors compatible with the VMX technology are used, then the VM context can be adjusted in such a way that the input/output instructions corresponding to certain ports exclude the VM EXIT and transfer control to the VMM. In turn, the VMM provides for input/output emulation and adjusts the VM context so that the input/output operation (e.g., the transfer of data to the devices for access to the network, printers, or the graphic subsystem) can be executed.

In another approach for safely executing guest code, potentially unsafe instructions can be replaced with instructions that cannot be executed in any mode of operation of the processor (i.e., invalid opcodes). Such instructions trigger an exit from the VM context and transfer control to the software debugger processing logic that may run in the VMM context.

Additionally, a heuristic approach for safely executing guest code can be used. In this case, breakpoints for some potentially unsafe instructions are not set up on the assumption that linked fragments of code contain instructions that will unavoidably result in raising an exception. Respective execution of the code fragment will be connected with the raising exception.

After raising the exception, linked code fragments will be checked for correspondence with predefined samples. If a linked code fragment corresponds to a sample, predetermined actions for the fragment will be executed. In particular, a point of return to the guest code can be set up, which provides for bypassing the potentially unsafe code fragment.

If the execution of potentially unsafe instructions precedes the raising of the exception, steps are performed to roll back the effect of the execution of the unsafe instructions and the execution of bypassing code is performed from the moment just before execution of the potentially unsafe instructions. In other words, in this case, the emulation of the guest code begins at the moment prior to raising the exception rather than at the moment of raising the exception.

The various approaches described herein for safely executing guest code can be implemented separately or in any combination, because the mechanisms for executing potentially unsafe instructions by the processor for each of the different types of instructions considered above are different. In particular, for different types of opcodes that force the processor to raise exceptions, hardware devices may implement different steps while transferring or returning controls, e.g., saving and restoring hardware processor registers.

Furthermore, the various approaches can also be used in combination with conventional techniques for executing potentially unsafe code, such as with predetermined emulating sequences for certain instructions.

The approaches described herein for safely executing guest code are advantageous because the operation of user applications may be accelerated. As potentially unsafe code fragments are processed and executed in an isolated context, all of the potentially safe code fragments can be directly executed "as they are" (i.e., without modification). Additionally, in general, it is not necessary to translate addresses in the safe code fragments, because one-byte substitution of interrupts for potentially unsafe instructions can be used to raise exceptions in the modified code.

Hardware support can be used for storing the registers and stacks of the processor when an exception is raised and for recovering the registers and stacks after return from the exception handling mode. Advantageously, the bypassing of instructions or their sequences, as well as adjusting the system to provide for safe execution of potentially unsafe instructions, can be performed without analyzing or changing the sequence of instructions to be executed after return from the exception trigger.

An additional advantage of the approaches described herein is that the atomicity of instructions in the analyzed code is not violated.

Replacing potentially unsafe instructions with exception triggers substantially reduces the need for modifying linked fragments of the code, because in most cases, the addresses used for transfers and identification of data sets are stored with the support of logic embedded in the hardware, e.g., in the hardware processor.

Therefore, in some cases, the approach of using interrupts (e.g., INT3) and invalid instructions is more desirable, because it allows for the insertion of exception triggers by substitution of one-byte instruction codes and does not violate the integrity of the rest of the code fragments. Also, when execution of the original code provides for entering the software debugger processing logic (in the given mode of operation of the processor), then using the software debugging technique (i.e., insertion of breakpoints or interrupts) requires that the original code be kept unmodified. When the software debugger can be entered without modifying the original code (e.g., through hardware support of the VM mode or by inserting breakpoints and using a separate area of memory for storing addresses of unsafe instructions), the original code can be directly executed.

Regardless of the type of hardware supporting the VM, in one approach, the context of the VM can be adjusted so that potentially unsafe instructions transfer control to the software debugger processing logic (e.g., through breakpoints with corresponding exception triggers), even without modifying these instructions. In this case, the exception raising may correspond to the transfer of control to the software debugger processing logic. For example, in the INTEL architecture, by setting to zero the "presence" bit of a certain segment descriptor in the Global Descriptor Table (GDT), which is a table in main memory that stores segment descriptors for each code segment, all operations for loading the segment into the segment register (e.g., mov DS, ax, etc.) will trigger the exception and transfer control to the VMM. A "segment" generally refers to the area of memory containing the machine code instructions of a program. For example, there is a special register in the INTEL architecture, called the code segment register (CS), which the processor checks prior to execution of any code. For every source code page, there is a corresponding value in the CS register (which defines the start address of the segment, the privilege level, and the limits, or size, of the segment, such that the entire segment in memory is linear and is uninterrupted in terms of its addresses). Note that the approach of adjusting the context of the VM can be implemented both separately and in combination with the software debugging technique.

Software Debugging Techniques for Safely Executing Guest Code

In one approach, original (i.e., source) guest code can be executed using the software debugger as follows. Before execution, the VMM analyzes the original guest code. The VMM generates modified (i.e., target) guest code by replacing potentially unsafe instructions with breakpoints (e.g., INT3 interrupts). During execution of the modified guest code, control is transferred to the VMM at the interrupts. In turn, the VMM, depending on the state of the VM, either restarts the guest code without emulation or emulates the potentially unsafe fragment of guest code in the emulation mode.

Note that "original" guest code and "source" guest code generally refer to unanalyzed guest code, while "modified" guest code and "target" guest code generally refer to analyzed and modified guest code that has been processed (e.g., by insertion of breakpoints in the original guest code) for direct execution. In one embodiment breakpoints can be placed directly into original code. Alternatively, breakpoints can be placed into copy of the portion of the original code. In that case, the same absolute effective (EIP) addresses of the instructions of the target code should be maintained. One possible technique can be to change guest code segment (CS) descriptor base address in GDT table.

An initial state of the computing system begins with launching a VMM (with or without a host operating system). Then, virtual machines (VMs) are created and launched with VMM support. A guest code that should be executed is loaded into memory in order to be executed inside the corresponding VM that supports native execution of some of opcodes of the guest code. Preferably, the guest code (e.g., user's application code or guest operating system code) is not analyzed and modified before starting the VM. In other words, preferably, all the operations providing safe execution and bypassing of guest opcodes are implemented at runtime during execution of VM support code.

After starting active threads, the control logic determines, at runtime, if guest opcodes or instructions are safe or potentially unsafe for the VM or the hardware system, and allows execution of safe instructions in a native mode.

Otherwise potentially unsafe instructions can be processed by a software debugger.

FIG. 1 illustrates an example technique using a software debugger for safe execution of guest code in a VM, where original guest code is directly executed. As described above, "guest code" includes user application code, as well as guest OS code, running in the VM context. Additionally, "unsafe instructions" include instructions that are actually unsafe or potentially unsafe, as described herein, and also include instructions that can be safe or unsafe in different context settings. For example, any instruction may be considered unsafe if the code sequence it contains has not been analyzed.

As shown in FIG. 1, an original page of guest code 101 running in a VM 140 includes safe instructions 110 and an unsafe instruction 115. When original page 101 is executed, unsafe instruction 115 transfers control 117 (e.g., by raising an exception) to a software debugger processing logic 120 (e.g., an exception handler). Upon gaining control, software debugger 120 analyzes sequences of guest code of original page 101 and either transfers control 125 back to unsafe instruction 115, which triggered the exception, or generates and executes bypassing code before transferring control 125 back to original page 101.

Optionally, software debugger 120 adjusts the context of VM 140 before transferring control 125 back to unsafe instruction 115.

Figure 2:
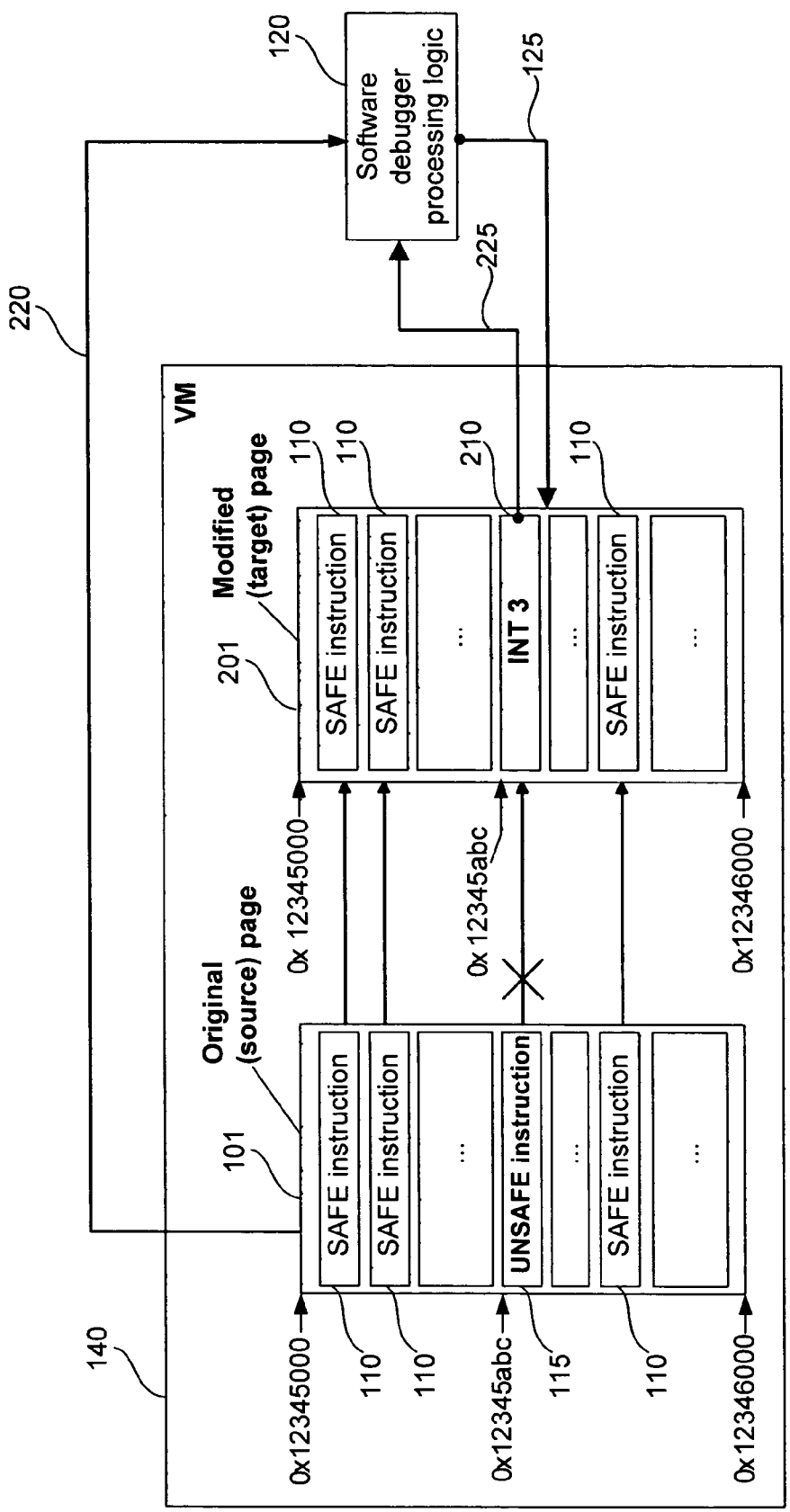
FIG. 2 illustrates an example technique using a software debugger for safe execution of guest code in a VM, where the software debugger generates modified guest code for execution.

FIG. 2 illustrates an example technique using a software debugger for safe execution of guest code in a VM, where the software debugger generates modified guest code for execution.

As shown in FIG. 2, original page 101 includes safe instructions 110 and unsafe instruction 115. A page of modified guest code 201 is created from original page 101, while original page 101 is stored in a memory. Modified page 201 is created by analyzing original page 101 and substituting unsafe instructions 115 by breakpoint instructions 210, as already described. Consequently, original page 101 is used for analyzing 220 the original code by software debugger processing logic 120 and generating bypassing instructions or tuning the context of the VM.

Figure 3:
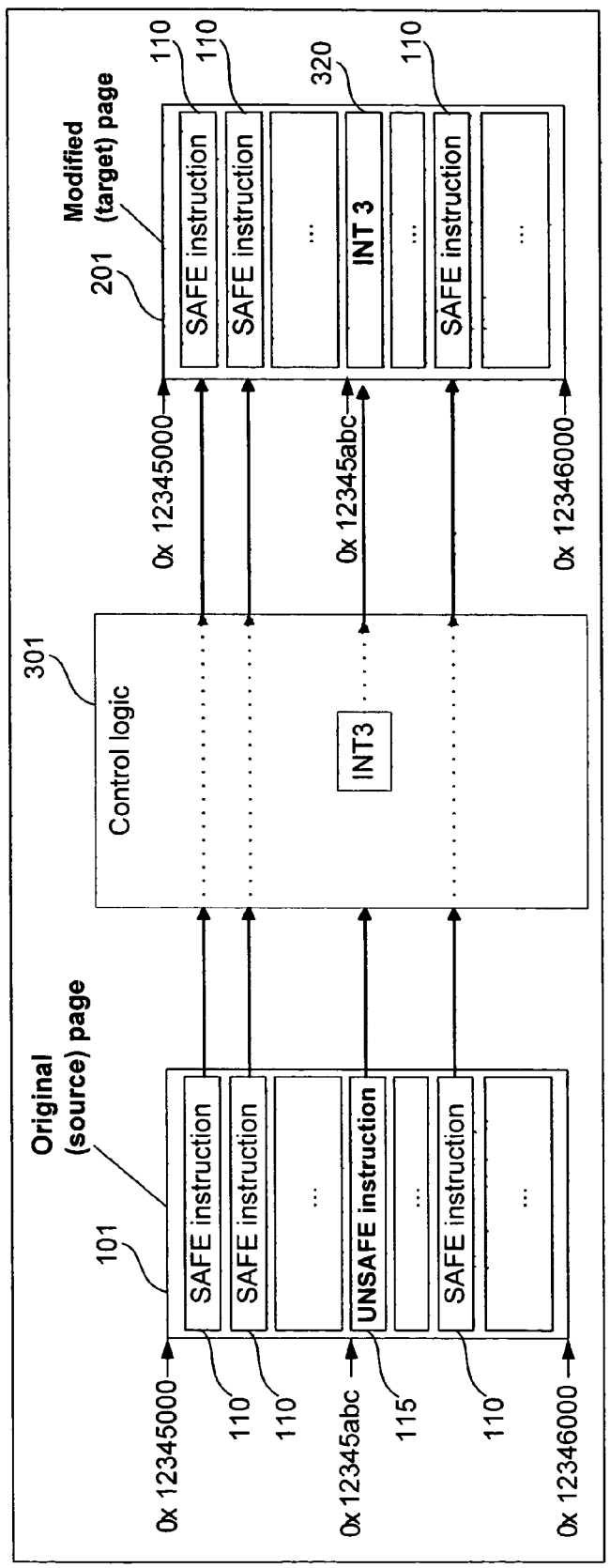
FIG. 3 illustrates an example technique for using control logic to generate a modified page of guest code for execution by replacing the unsafe instructions of an original page of guest code with breakpoints.
Figure 4:
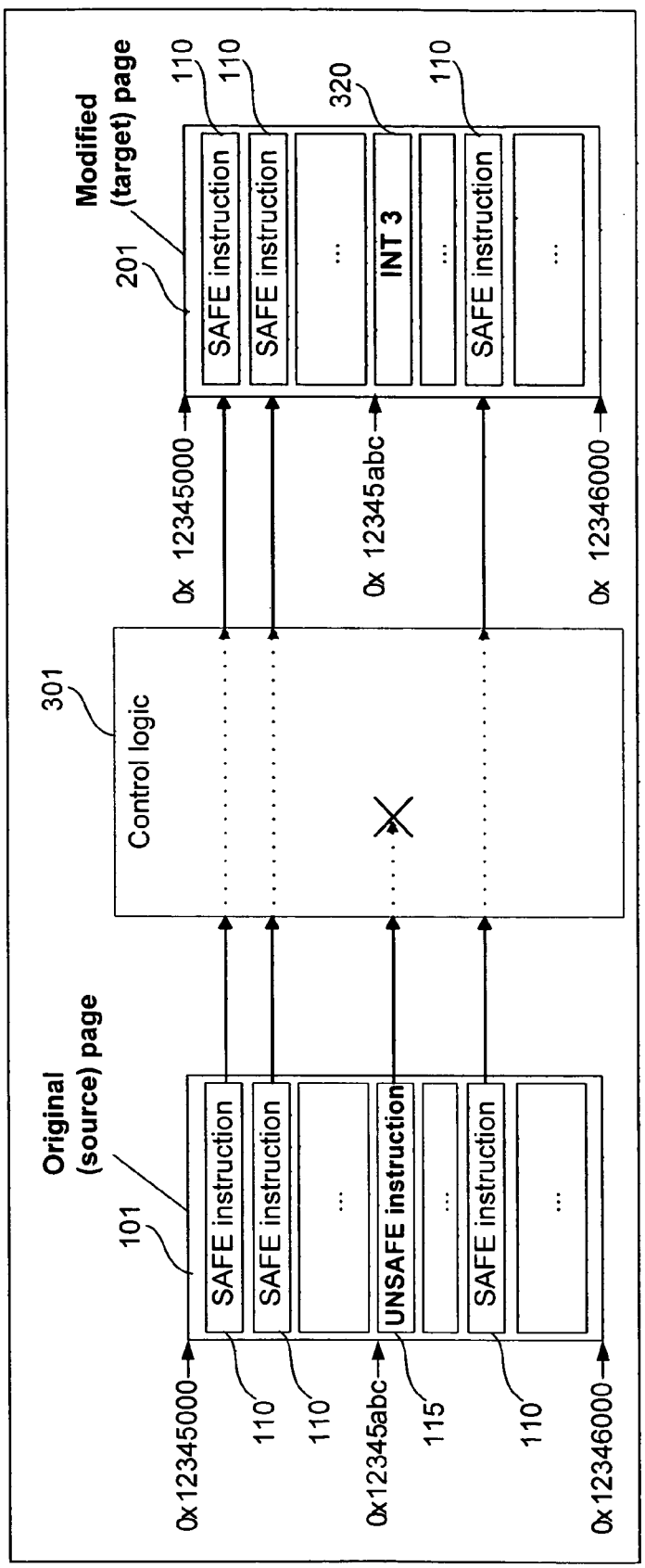
FIG. 4 illustrates an example technique for using control logic to generate a modified page of guest code for execution by replacing breakpoints of a initial page with the safe instructions of an original page of guest code.

First, original pages are analyzed by control logic (not shown), such as control logic 301 shown in FIGS. 3 and 4. The control logic (i.e., the software portion of the control logic) checks the instructions of original page 101 and generates a modified page 201, for example, as shown in FIGS. 3 and 4 and described below. In modified page 201, the control logic replaces unsafe instruction 115 with an interrupt 210, and inserts safe instructions 110 without modification. Subsequently, execution of original page 101 is substituted by execution of modified page 201, which is used to create executable software images. During execution of modified page 201, control is transferred 225 to software debugger processing logic 120 at interrupt 210. Software debugger processing logic 120, analyzes 220 the corresponding code of original page 101, and either generates bypassing instructions or adjusts the context of VM 140 before transferring control 125 back to modified page 201 (e.g., to the next instruction or to the following instruction sequences). The control may be transferred to the same page or to any other page of the modified code depending on the code being executed or depending on original page of code 101.

Optionally, original page 101 is copied to form an initial page of guest code, and the initial page is subsequently modified to form modified page 201.

FIG. 3 illustrates an example technique for using control logic to generate a modified page of guest code for execution by replacing the unsafe instructions of an original page of guest code with breakpoints. As shown in FIG. 3, original page 101 includes safe instructions 110 and unsafe instructions 115. A control logic 301 analyzes the instructions of original page 101. Control logic 301 writes safe instructions 110 to modified page 201, without modification, and replaces unsafe instruction 115 with a breakpoint 320 (e.g., INT3 interrupt).

Optionally, original page 101 is copied to form an initial page and the initial page is modified to form modified page 201. In the example of FIG. 3, control logic 301 analyzes the instructions of original page 101 and replaces unsafe instruction 115 in the initial page with a breakpoint 320 (e.g., an interrupt, such as those defined in the INTEL instruction set). After control logic 301 analyzes all of the instructions of original page 101, modified page 201 has been created.

FIG. 4 illustrates an example technique for using control logic to generate a modified page of guest code for execution, by replacing breakpoints of an initial page with the safe instructions of an original page of guest code. In the technique illustrated in FIG. 4, an initial page filled with breakpoints (not shown) is generated. Subsequently, control logic 301 analyzes the instructions of original page 101, which contains safe instructions 110 and unsafe instruction 115. To generate modified page 201, control logic 301 replaces breakpoints of the initial page with safe instructions 110, with address offsets preserved, such that modified page 201 includes only safe instructions 110 and a breakpoint 320 in the place of unsafe instruction 115.

The advantage of the technique illustrated in FIG. 4, is that the initial page can be safely executed in the VM not only after control logic 301 completes analyzing original page 101, but also prior to initiating the analysis process. Thus, when an attempt is made to execute the initial page prior to analysis of original page 101, breakpoints will be executed instead of page fault exceptions and control will be transferred to the appropriate exception handler. During handling of the exception, control logic 301 can initiate the analysis of original code 101.

The techniques described herein for safe execution of guest code can be implemented by direct execution of the guest code, by execution of the guest code with the support of software debugger processing logic 120, or by a combination of both direct execution and execution with the support of the software debugger.

During direct execution of the guest code, the guest code is executed in VM 140 without a preliminary check and analysis. In this case, the VM context is adjusted such that before an attempt to execute unsafe instructions, and as a result of an attempt to execute unsafe instructions, control is transferred to software debugger processing logic 120 (e.g., exceptions are raised by the hardware processor or by the chipset). When certain exceptions are executed, control is transferred to the software debugging processing logic 120, e.g., in the context of the VMM. In turn, the software debugger processing logic 120 bypasses the unsafe instructions or undertakes other actions, depending on the mode of operation or on the portion of the program code that causes raising the exception. The technique illustrated in FIG. 1 is an example of direct execution of the guest code.

When the guest code is not directly executed, and the software debugging technique is used, the guest code is previously analyzed to generate modified code, which may be saved in a cache and executed instead of the original guest code. Alternatively, breakpoints can be placed directly into original code. In this case, potentially unsafe instructions of the original guest code are replaced with opcodes (e.g., the insertion of interrupts) that transfer control to software debugger processing logic 120. The technique illustrated in FIG. 2 is an example of execution of the guest code in software debugger processing logic 120.

When the modified code is executed and an exception is raised, software debugger processing logic 120 analyzes the original guest code fragment that causes raising the exception, assesses the potentially unsafe instructions, and generates and executes bypassing instructions instead of directly executing the potentially unsafe instructions of the original guest code fragment. Note that during this process, certain instructions of the original code may be, in fact, deleted and replaced with useless fragments of code. Also, the bypassing instructions are not inserted into the modified code but are executed in the VMM or VM context according to the exceptions, that is, in a special mode of operation of the hardware of the computer system.

During execution of the modified code, control is transferred to software debugger processing logic 120 (e.g., an exception handler). The transfer of control is carried out by the control logic 301. Software debugger processing logic 120 processes the exception and then transfers control back to the guest code. Accordingly, the point of return is determined based on analysis of the source instructions.

The software debugger processing logic 120 can emulate, ignore or forbid execution of certain instructions, as well as certain sequences of instructions. Additionally, in some cases, after the VMM gains control after raising an exception, if the analysis determines that direct (i.e., native) execution of the potentially unsafe instructions is possible, the VMM provides for execution of the guest code without any additional steps.

The VMM can undertake other actions, as well, depending on the settings of the exception handler. For example, potentially unsafe instructions for the VM can be executed in the VMM context, and control can be subsequently transferred back to the VM. Also, the VMM can transfer control to a software debugger of the guest OS, for example, if the raising exception is caused by a failure in operation of the software, subject to processing by the guest OS.

Figure 5:
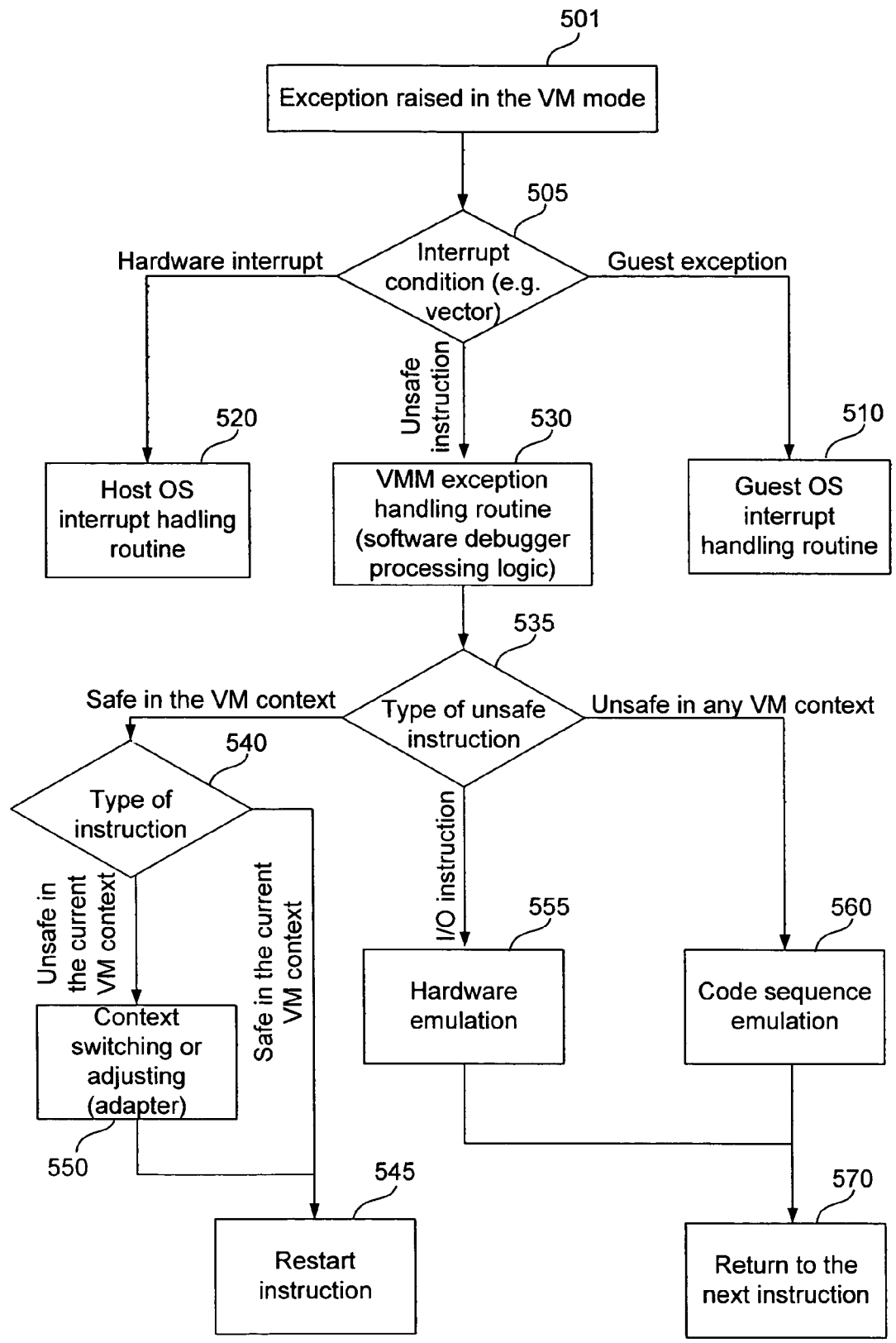
FIG. 5 illustrates a logic structure providing proper interrupt handling.

FIG. 5 illustrates a logic structure providing proper interrupt handling, according to one or more embodiments of the present invention. Note that the logic shown in FIG. 5 can be performed either inside the VMM and/or the VM, or by creating different types of exception handlers for different interrupt vectors. In the latter case, some of the logic described may be implemented by the control logic by using proper interrupt codes and binary insertion of the interrupt opcodes.

As shown in FIG. 5, some types of exceptions can be treated by procedures outside the VMM. Such exceptions include hardware interrupts, which should be treated by the host OS, and exceptions generated by illegal instruction execution, which should be treated inside the VM by the guest OS.

In step 501 of FIG. 5, an exception is raised in the VM mode. In step 505, an exception handling routine is called based on the type of instructions or set of instructions that causes raising the exception in step 501.

If the exception is raised during the normal software execution process, and the exception can be handled by the guest OS, then exception handling is transferred to step 510 to the guest OS (e.g., to a guest OS interrupt or exception handling routine). If the exception is another type of exception, such as a hardware interrupt, then exception handling is transferred to a host OS interrupt handling routine (step 520). If the exception is triggered as a result of an attempt to execute an unsafe or potentially unsafe instruction in the VM context, then control is transferred to a VMM exception handling routine (step 530). The VMM exception handling routine then proceeds to step 535 to analyze the original code.

If in step 535 it is determined that the corresponding instruction may be executed safely in some VM context (e.g., the original instruction may be a RET to an analyzed instruction of an existing page), then, in step 540, the VMM checks if the instruction is safe in the current VM context.

If in step 540 it is determined that the instruction is safe in the current VM context, then, in step 545, the VMM restarts execution of the analyzed instruction. On the other hand, if in step 540 it is determined that the instruction is unsafe in the current VM context, then, in step 550, the VMM adjusts the VM context (e.g., the original instruction may be a RET operation to a page out of the currently mapped frame, in which case, the VM context is adjusted before the RET operation—i.e., the target frame determines the mapping instead of current frame, and then execution of the instruction is restarted in step 545).

There are a number of potentially unsafe instructions whose safety is unknown prior to execution during code analysis. Safety of such instructions depends on the VM context, and the same instruction can be safe in one VM context and unsafe in a different VM context. Even particular instruction located at a particular address in guest code can be safe during a first pass of the guest code and can be unsafe during a second pass (because of the VM context might be different.

Some non-limiting examples of such instructions are:

a) RET and other indirect control transfers (like CALL EAX, JMP EAX and so on, in the Intel architecture). These instructions are unsafe because their destination address is not known prior to execution. If the destination address resides in a current frame address space, it is a safe instruction, otherwise, it is unsafe.

b) POPF instruction. This instruction gets flags (EFLAGS register) from the stack. Some flags in EFLAGS might not be emulated (like arithmetic ones—OF, CF, ZF etc.), and others might be emulated (like interrupt flag IF, IOPL, RF etc.). If emulated flags are not affected by POPF, then it is safe in current VM context and unsafe otherwise.

Since the safety of such instructions cannot be determined during the analysis phase, breakpoint or quick stubs have to be placed at those locations, and then dealt with at run-time. At run-time, the VM context can be analyzed, with the following possibilities:

1. Instruction is safe in current VM context. We could resume guest code execution without any other concerns.

Examples of this are:

a) RET or other indirect control transfers, whose destination address resides in the current frame. It is safe to execute this instruction natively in a current VM context.

b) POPF does not affect any emulated flag, and can be executed natively in current VM context.

2. Instruction is not safe in current VM context, but VM context can be adjusted to make it safe. Then guest code execution can be safely resumed.

Examples of this are:

a) RET or other indirect control transfers, whose destination address resides out of the current frame and the target frame is already cached. The VM context can be adjusted by remapping target frame instead of current one. It is safe to execute this instruction natively in the adjusted VM context.

b) POPF restore IF flag (interrupt flag)—for example, one of the emulated flags (IF flag)=0 in the current VM context, and POPF tries to set it to 1, in that case, interrupts will be enabled, and pending virtual interrupts have to be processed in the VMM—however, in this case, there are no pending interrupts. The VM context is adjusted by restoring IF flags in VMM emulated EFLAGS. It is safe to execute this instruction natively in the adjusted VM context.

3. Instruction is not safe in current VM context and it is not possible to adjust VM context to make it safe. This would be handled by switching to the VMM and performing a full emulation cycle.

Examples of this are:

a) RET or other indirect control transfers target address resides out of the current frame and the target frame is not cached. A full context switch to VMM should be done, to allocate a new frame.

b) POPF restore IF flag (interrupt flag)—for example, one of the emulated flags (IF flag)=0 in the current VM context, and POPF tries to set it to 1, in that case, interrupts will be enabled, and pending virtual interrupts have to be processed in the VMM—however, in this case, there are no pending interrupts. A context switch to the VMM would be performed to process all pending virtual interrupts.

If in step 535 it is determined that the corresponding instruction is an input/output instruction, then, in step 555, the corresponding instruction is emulated by virtual hardware emulation. Such an instruction can include I/O instructions that should be executed in the highest privilege level of the guest OS. In step 570 control is transferred to the next instruction following the unsafe instruction that has been analyzed.

If in step 535 it is determined that the corresponding instruction is an instruction that cannot be safely executed in any VM context, then, in step 560, the corresponding instruction is emulated by code sequence emulation. For example, some instructions should be executed on the current hardware platform or in the current privilege level, such as instructions that are not present in the processor hardware logic or in the chipset logic. In step 570, control is transferred to the next instruction following the unsafe that has been analyzed.

Paging and Framing Techniques for Safely Executing Guest Code

As described earlier, with reference to FIG. 3 and FIG. 5, exception handling may be based on using a paging model of address processing by the processor, and is implemented as follows:

1. A page of the original guest code is analyzed;
2. A copy of the page of the original guest code is created and certain unsafe instructions are replaced with breakpoints to generate a modified page of guest code;
3. The modified page of guest code is executed; and
4. During execution of the modified page, control is transferred to the VMM if exceptions are triggered at the breakpoints, and the VMM, by analyzing the VM context, either (i) generates bypassing code, which does not contain unsafe instructions, or (ii) provides execution of the unmodified original guest code, or (iii) provides for execution of different code, which ensures that the execution of the potentially unsafe instructions becomes safe, for example, by adjusting the VMM context.

Note that in addition to the modified page of the guest code, a copy of the original page of the guest code must also be stored, because the VMM subsequently provides for the safe execution or emulation of instructions based on analysis of the original guest code.

Depending on the nature of the instruction or group of instructions whose execution has just been bypassed by the debugger 120, control can be transferred back to the modified page of guest code after the VMM completes the debugger 120 operation. For example, control can be transferred to an instruction in the modified page of guest code that follows the instruction or group of instructions whose execution has just been emulated by the debugger 120.

Alternatively, control can be transferred to some other page of guest code after the VMM completes the debugger 120 operation. In this case, it is possible that breakpoints are inserted for all instructions requiring inter-page transfers, such that control must be transferred to an instruction on some other page of guest code, rather than to an instruction in the modified page of guest code. Thus, during emulation, instead of the modified page of guest code, the VMM substitutes the other page of guest code to which the transfer is directed. For small page sizes, large overhead is incurred, because all inter-page transfers of control would have to be processed by the VMM.

Figure 6:
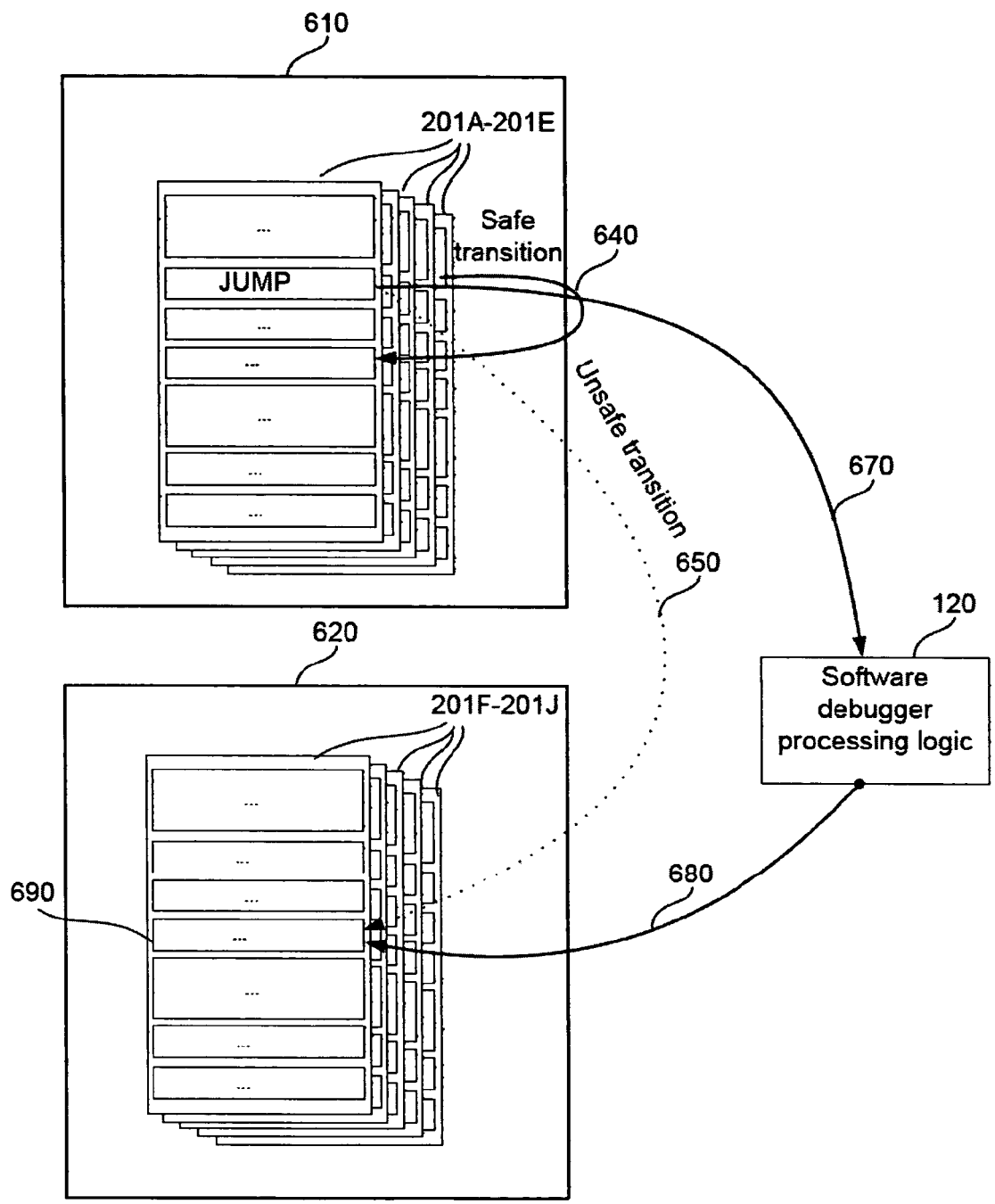
FIG. 6 illustrates example technique for handling inter-frame or intra-frame transitions.

To address the issue of increased overhead for processing inter-page transfers of control, a paging technique can be used that integrates pages of guest code into linear frames, as shown in FIG. 6, which is described in detail below. As a result, intra-page transfers are safe, while inter-frame transfers are unsafe. Thus, the number of exceptions raised during execution of the guest code substantially decreases, and overhead is reduced accordingly.

Note that more than one frame can be mapped simultaneously. Each frame can represent different guest OS address range. All inter-frame control transfers for currently mapped frames can run natively, without switching to the VMM context. An inter-frame control transfer targeting a currently unmapped frame leads to invoking VMM and remapping a least used frame with a new one. Then, execution continues. This allows covering control transfers of a very wide address range that cannot be covered by a single "monolithic" frame.

According to the paging technique, pages of guest code can be grouped into guest code frames, which are configured to cause the processor to raise exceptions on all of the potentially unsafe instructions.

In one approach, a frame is created as follows. An area of guest linear address space that is divisible by 4 MB (a size selected based on empirical considerations) is selected for the executable code. To identify this area in the VM context, a set of values of a page directory entry (PDE) is used, where each PDE can reflect 4 MB of the address space. Thus, a frame is a set of sequential pages, whose number in a particular implementation is determined beforehand, where each of the pages is defined by a corresponding index of the PDE.

In another approach, during analysis of the instructions of a frame of guest code, the frame is initially characterized only by one addressable page, and the other pages are mapped as "not present." Subsequently, the frame can be filled with analyzed pages of guest code. If control is transferred to a page that is mapped as "not present," an exception is raised (i.e., a page fault exception), and the VMM obtains control and analyzes the next portion of the guest code. After analysis, the VMM transfers control back to the frame.

In another approach, an "inverse analysis" technique is used. First, a frame of pages is formed, where the pages are completely filled with breakpoints. That is, pages are formed for executable instructions, consisting of nothing but breakpoints. Thus, all of the instructions of the original guest code are regarded as unsafe until proven safe.

During analysis of the original guest code, only the safe instructions of the original guest code are copied to corresponding addresses of the pages, replacing the breakpoints, as necessary, while the unsafe instructions of the original guest code are not copied to corresponding addresses of the pages, and breakpoints remain in their place. Thus, during analysis of the original guest code, the pages filled by breakpoints are mapped so that they can be accessed upon execution of the guest code.

During execution, if control is transferred to a page that is already mapped, but to a fragment of guest code that has not been analyzed and that includes a breakpoint (e.g., an INT3), an exception is raised and control is transferred to the VMM. The VMM analyzes the next portion of the code, and then transfers control back to the frame.

FIG. 6 illustrates a example technique for handling intra-frame and inter-frame transfers of control. As described above, pages of modified code 201A-201E and 201F-201J can be grouped into frames 610 and 620, respectively, such that execution of the code in a frame can be treated as "safe."

In FIG. 6, all pages of modified code 201A-201E of frame 610 should be present in the VM context simultaneously (i.e., can be reflected in the frame page tables). As shown, a transition 640 from an instruction inside frame 610 to another instruction inside frame 610 is treated as safe and can be executed without calling software debugger processing logic 120. On the other hand, a transition 650 from an instruction inside frame 610 to another instruction outside frame 610, which is inside another frame not present in the VM context (e.g., frame 620) is unsafe. Example unsafe transitions include inter-frame CALL or JUMP instructions. Unsafe transitions must be executed by calling software debugger processing logic 120.

As shown in FIG. 6, unsafe transition 650 transfers control 670 to software debugging processing logic 120. Software debugging processing logic 120 adjusts the context of the VM, for example, by exchanging the frame PDEs, and transfers control 680 to a corresponding instruction 690 of frame 620 that is already reflected in the VM context.

Unsafe CALL or JUMP instructions can be handled with or without modification of opcodes. In one embodiment, when the processor supports page execution attributes (such as "execute only" or "no execute") any attempt to transfer control pages out of the current frame, however, will trigger raising a page fault exception (only pages of the current frame will be marked as available for code execution). Consequently, the frame required can be accessed after the original guest code is analyzed.

Since the destination address is not known, and therefore, it is not known whether this is an intra- or inter-frame control transfer, such instructions should be treated as potentially unsafe. Note that there can be exceptions to this rule—e.g., 16 bit mode operation, where transfers are limited by a 64 Kbyte range, and all control transfers can be guaranteed to be intra-frame. Another second exception is if the processor has a "no execute" or "execute only" attribute. By using it, all inter-frame transfers can be made safe by automatically raising an exception that will be intercepted by VMM. However, for most applications, all indirect control transfers should be as potentially unsafe because its destination addresses cannot be known. To handle such instructions, stub technology can be used at runtime, to invoke a special check routine at run-time. The destination address is checked, and if the destination address is inside current frame, the execution of the instruction is restarted, otherwise, the VM context is adjusted by mapping a new frame instead of current one, and then continuing execution.

In another approach, mapping certain pages in a frame as "present" pages and unmapping certain pages in the frame as "not present" provides a mechanism for protecting the VM against attempts to execute potentially unsafe guest code.

Figure 7:
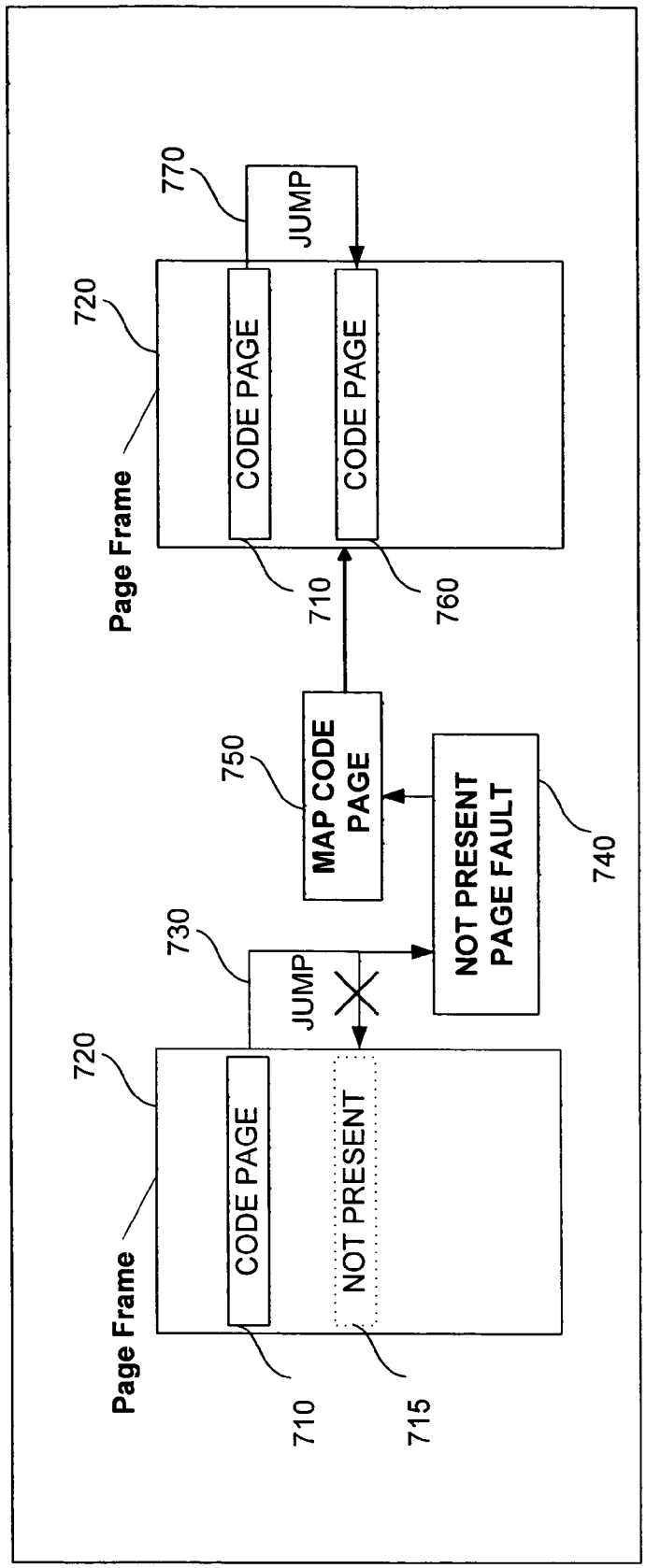
FIG. 7 illustrates an example technique for protecting a VM against unsafe CALL or JUMP instructions.

FIG. 7 illustrates an example technique for protecting the VM against attempts to execute pages of unanalyzed guest code. As shown in FIG. 7, a guest code frame 720 includes a page 710. When page 710 attempts to access an unmapped page 715 by a JUMP instruction 730, a page fault exception 740 is raised. An exception handler, for example, software debugger processing logic 120, analyzes the code of unmapped page 715 and maps 750 a modified page 760. Subsequently, page 710 can access modified page 760 by JUMP instruction 770.

Figure 8:
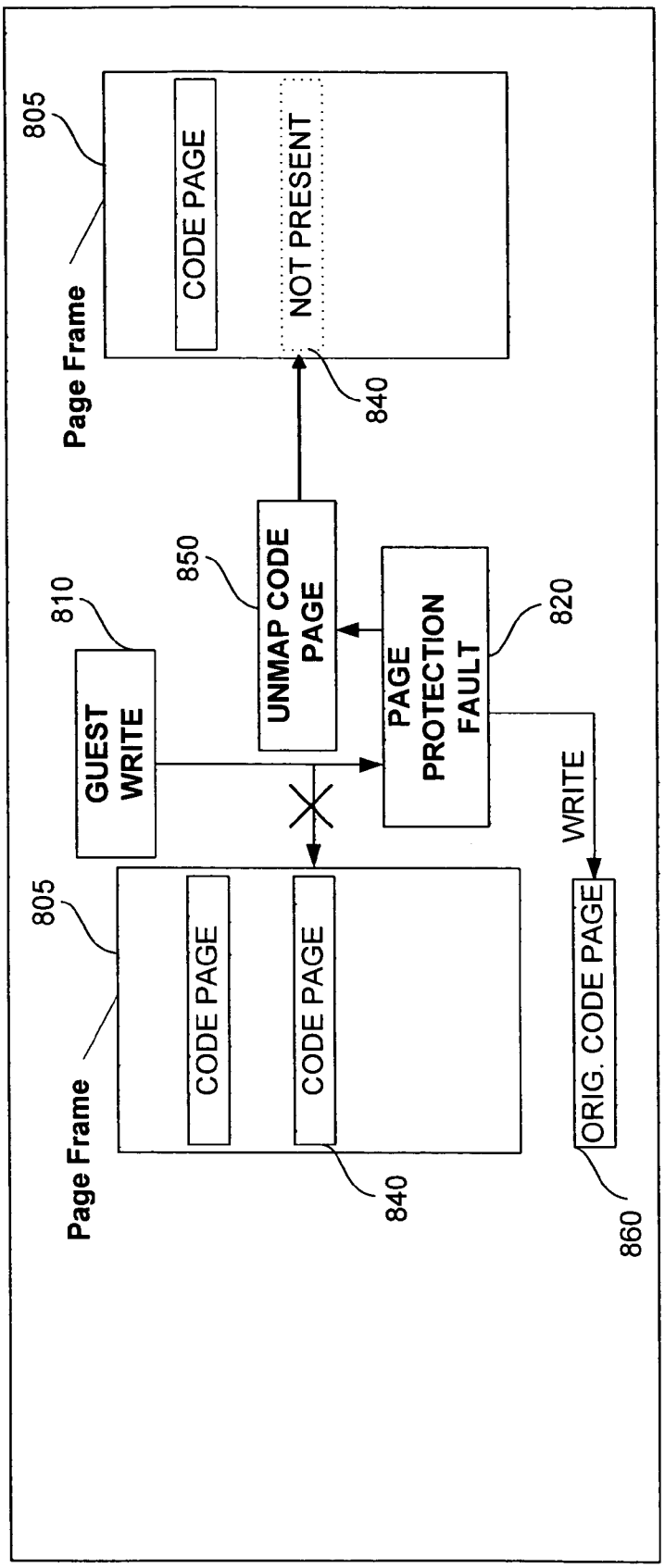
FIG. 8 illustrates an example technique for protecting a VM against self-modifying code.

FIG. 8 illustrates an example technique for handling self-modifying code (SMC). Since the original guest code is executed from previously analyzed pages, the VM should be protected against unauthorized code modification. To protect against SMC, a technique that maintains the integrity of the analyzed guest code can be used. For example, a WRITE instruction can be safely executed by writing to an original page of guest code, for which a corresponding page of previously analyzed guest code is stored in cache. Thus, the previously analyzed page of guest code is protected from the WRITE instruction.

In the example of FIG. 8, a guest code frame 805 includes a previously analyzed page of guest code 840. A guest WRITE instruction 810, attempts to modify previously analyzed page 840 and triggers a page protection fault 820. Using an exception handler, such as software debugger processing logic 120, previously analyzed page 840 is unmapped 850, such that previously analyzed page 840 is marked as "not present" in frame 805. Any further attempt to access previously analyzed page 840 will trigger page protection fault 820 and transfer control to the exception handler, which will create a modified page from the corresponding page of the original SMC. Also, guest WRITE instruction 810 is executed by redirection to original page 860.

After the new code is written to original page 860, previously analyzed page 840 is unmapped from the frame. In one embodiment modified code page is right away will be removed from code cache and the protection will be removed from the original source page. In other embodiment this page marked as "dirty" in modified code cache and protection is removed from original code page (it will give us performance in case guest code further will proceed more writing to this page—avoiding excessive page faults). If subsequently guest code trying to transfer control to this page again we getting page fault (the page is unmapped from frame) then VMM getting page from modified code cache and checking is any of analyzed area were affected by the changes. If so page will be flushed from code cache and will be analyzed once again. Furthermore, if necessary, this technique for processing the guest code can be repeated.

In analyzing original guest code, all intra-frame transfers of control are regarded as native (i.e., naturally safe), so the intra-frame transfers are not replaced with breakpoints. If control is transferred to another page of the frame, a hardware exception of "not present" (i.e., a page fault exception) is raised, which is supported directly by the processor, and control is transferred to the VMM. The VMM generates a new page in a code cache and maps it in the frame, and analyzes the portion of the original guest code that corresponds to this page. The VMM copies safe instructions of the original guest code to the corresponding addresses of the new page of the frame, and unsafe or potentially unsafe instructions with breakpoints. After analysis, the VMM transfers control back to the instruction of the page of the frame.

In place of an instruction to transfer control to another frame, that instruction is replaced by a breakpoint (e.g., an INT3 interrupt, or, in the case of inverse analysis, the INT3 interrupt is not replaced). When the exception is raised, control is transferred to the VMM and, by re-writing the PDE set, the VMM switches to the other frame. Because the executed code can consist of several frames, with periodic switching between them, the size of the frame can be optimized to maximize the number of intra-frame transfers of control during execution of the guest code (and to minimize inter-frame transfers). In addition, for optimization of switching between the frames, some recently used frames can be simultaneously mapped in the linear space of the VM. This allows native execution of control transfers across a very large address range that cannot fit into a single frame of a reasonable size.

Replacing inter-frame transfers with breakpoints is not required if each attempt to transfer control to another frame triggers raising a page fault exception (assuming the processor supports "no execute" or "execute only" page attributes). In this case, all the instructions of the guest code can be analyzed on a frame-by-frame basis. In other words, simultaneously, inside the context of the VM, pages from the single frame only are analyzed. When CALL or JUMP instructions from another frame are encountered, the VM transfers control to the VMM so that the VMM updates the PDE and then transfers control back to the VM.

During analysis of guest code, instructions to transfer control to previously unknown addresses might be encountered (e.g., RET, CALL EAX, etc.). For such instructions, it is impossible during analysis to determine whether the transfer of control is safe (i.e., an intra-frame transfer) or unsafe (i.e., and inter-frame transfer).

In this case, all the RETURN instructions are potentially unsafe since a priori all the RETURN instructions depend on a CALL instruction that can cause a "back to another frame" transfer.

For such instructions, stubs for quickly checking the safety of an instruction can be used. A stub is a remote procedure called upon to perform some task. The stubs can be located in the VM context, as well as in VMM context. When an exception is raised, the VMM gets control and checks if the transfer of control is intra-frame or inter-frame. If the transfer is an intra-frame transfer of control, then execution of the guest code is resumed. If the transfer is an inter-frame transfer of control, then the current frame is switched, and execution of the guest code is also resumed.

Because certain sequences of instructions can be executed many times, a cache can be formed during the course of operation of the software debugger for storing the images of the most frequently used pages.

There is a special register in the INTEL architecture, called the code segment register (CS), which the processor checks prior to execution of any code. For every source code page, there is a corresponding value in the CS register (which defines the start address of the segment, the privilege level, and the limits, or size, of the segment, such that the entire segment in memory is linear and is uninterrupted in terms of its addresses). After being analyzed by the VMM, the page is found at a different address, with the absolute addresses being different in the target code as compared to the addresses of the source code (if nothing is done to ensure that address integrity is preserved).

Note that the addresses in fact are derived using the beginning address of the segment in the CS register as a base. This means, that, in order to preserve the integrity of the addressing scheme in the target page, the start address in the CS register needs to be correspondingly shifted as well. In other words, by changing the value of the start address of that segment, it is possible to ensure that instructions, which require both absolute and relative addresses to return a correct result, will get a correct address value. However, since the descriptor of the CS register has been modified, the instructions need to be emulated. Therefore, the unsafe instructions are replaced with breakpoints, or exception triggers.

Phrased another way, the values in the CS register that previously corresponded to the guest code are replaced with new values. This is done such that the starting address in the CS register is always shifted compared to the original address for the source code. The end result is that the target page in the cache that is actually executed by the VM is effectively at the same address as the original (source) code of the guest code was.

Note also that this is done only for the CS register. The other registers, such as the data segment registers (DS), extra segment registers (ES, FS, GS), and others, all point to where they previously pointed to in the guest code. Note that the problem that is encountered with regard to SMC does not arise with regard to self-examining code. In other words, when SMC is executed, the technique of using the CS register with a shifted base address is used, but when a READ instruction is attempted, as is the case with self-examining code, the technique is unnecessary. In other words, if the guest code tries to read using CS register, it will read modified code—not the original one. Some very rare old guest OSs use the CS register for reading data, however, all read instructions are marked with a CS prefix as potentially unsafe to avoid this problem.

In another approach, if potentially unsafe instructions are replaced with interrupts in the initially modified page, then, after the VMM processes the interrupt, execution of the fragments of the code replaced by the interrupt can be resumed.

Optionally, the unsafe instructions or their sequences can be complemented by instructions of transfer to the fragments of code formerly formed in the cache, for example, by commands for invoking procedures or by transfer commands. For each page of the original guest code, a modified page is generated, which is a copy of the original page, with unsafe instructions replaced by breakpoints.

In order to minimize overhead for repeated analysis of previously analyzed code, the modified pages with the breakpoints inserted are stored in the cache of the original code. Before the first execution, the modified page maps itself to the linear space of the current frame of pages. As described above, a new basis address in the descriptor of the CS register is set for the area of the guest linear space where the current frame is mapped. In one embodiment, a procedure for analyzing the code is performed for a page with a given physical address and offset. This analysis is performed for a guest physical page of memory. That is, a new page of memory with the guest code is formed, where the unsafe instructions, as well as the yet unanalyzed instructions, are replaced by breakpoints.

Additionally, the fragment of the modified code designed for execution has the same length as the fragment of the original code and the physical addresses of operation of the original code and modified code are not changed. Replacing unsafe instructions with one-byte interrupts provides for the possibility of emulating not only sequences of instructions but individual instructions as well.

Optionally, these techniques can be optimized by implementing them with an additional technique that uses stubs for certain types or classes of instructions or set of instructions.

In one approach, fast INT(n) stubs are used. As described above, a technique is used that replaces unsafe instructions with INT3 opcodes. The interrupt triggers raising an exception and a switch from a Ring 3 privilege level to a Ring 0 privilege level (in the INTEL architecture), and the VMM creates bypassing instructions for the unsafe instruction. This technique is time consuming and can be optimized by replacing some instructions with an INT(n) interrupt. An exception handler, corresponding to the n vector, is on the same Ring 3 privilege level and simply checks whether the unsafe instruction can be run natively or whether it should be bypassed by using main INT3 schema. In other words, some types or classes of instructions, which generate certain types of interrupt descriptor table (IDT) vectors, can be replaced with INT(n) interrupts. Control is then transferred to an exception handler, which either executes the instruction and transfers control back to the native code or calls the Ring 0 privilege level exception handler.

In another approach, fast JMP stubs are used. Instead of INT instructions, JMP instructions are used to replace specific instructions or sets of instructions. This technique operates similarly to, but is faster than, the technique using the INT(n) stubs. However, one problem in this case is that a JMP instruction is longer than an INT(n) instruction. Thus, a block of instructions can be replaced with a first JMP instruction (i.e., if the JMP opcode is five bytes in length, then the unsafe instruction itself and up to four instructions before it are replaced). The safe instructions that are replaced by the first JMP instruction are copied to a temporary shadow page called by the first JMP instruction. All instructions addresses both on the primary target page and on the shadow page remain the same, and correspond to addresses on the original source page. A second JMP instruction that leads to a stub is inserted after the safe instructions on the shadow page. During execution, the first JMP instruction transfers control to the safe instructions on the temporary page. After the safe instructions are executed, the second JMP instruction transfers control to the stub. Inside the stub, the unsafe instruction is checked to determine is safe execution within current VM context or modifying VM context for safe execution possible. If safe execution is possible, then guest code execution is resumed. If safe execution is possible in adjusted VM context, then VM context is adjusted, and guest code execution is resumed. Otherwise, this instruction should be emulated by the primary INT3 scheme.

Using JMP stubs is faster than using INT(n) stubs because the exception handler requires additional pushing and saving of the register stack and subsequent popping and loading of the stack.

For virtualization of the segment model, the descriptors from the GDT and the local descriptor table (LDT) of the VM are translated to the descriptors of the GDT and LDT of the VMM, and the tables of the VMM are used as the real descriptor tables. That is, when addressing to the GDT and LDT from the VM, the tables are substituted by corresponding images installed for each machine. It is more convenient to perform these operations from the software debugger since the substitution is implemented only at the first attempt to execute (i.e., during the first addressing that is limited by the time of execution of instructions for one VM or one frame).

Optionally, the interrupts can be checked to determine the cause of the formation of the interrupts. The necessity to check the interrupts follows from the fact that during the execution of the applications, the formation of interrupts in the guest OS can arise not only due to modification of the code but also as a result of execution of code, which did not constitute a danger from the viewpoint of the guest OS or VM. Additionally, during execution of the guest code, hardware interrupts can be generated. The VMM determines the cause of the formation of the interrupt and determines which measures are necessary to resolve the problem.

When processing the interrupts in correspondence with the table of descriptors of interrupts, control is transferred either to a procedure that processes the exceptions and is a part of the VMM, or to a procedure that processes the hardware interrupts and is a part of the main OS. Additionally, control can be transferred to the exception handler of the guest OS.

When the INTEL VMX technology is used, the checking of interrupts is not always needed. For example, the interrupts formed due to opcode errors or of access to the data (i.e., native execution of the guest code) can differ from the interrupts formed during the execution of instructions that are unsafe in VM context. In the case of VMX technology, depending on the chosen strategy of virtualization, several interrupts and exceptions can be processed locally within the VM by the exception handlers of the guest OS.

In particular, a decision can be made within the VM in response to the hardware interrupt to emulate and suspend execution of instructions of the VM or of the guest OS. Alternatively, a decision can be made to execute the interrupt by an exception handler of the main OS.

In one approach, each VM context can have its own procedure or program for processing interrupts that is determined based on possible differences in the structure or adjustments of several VMs being controlled by one VMM. Therefore, the VMM makes a decision to transfer processing of the interrupt or exception either to the VM context or to the context of the host OS. Such handling of exceptions enables unique emulation procedures to be used not only for processes but also for access to data for each VM.

If the stubs are used for accelerated emulation, it is possible to save the guest context. For example, for instructions, which are processed using the stub technique, a simple emulation can be used that includes checking the address of the transfer of control and intra-frame transfer of control, or frame switching. During the execution of the code that has been processed by the software debugger, the addresses of the instructions are not changed. In one approach, the addresses transferred to the instruction pointer register (EIP) during execution of the analyzed code with the breakpoints inserted are identical to addresses of the original code. After execution of the stub, the EIP addresses will be changed, but the original EIP addresses can be obtained from a stack, because when the stub is called, the initial EIP is saved in the stack.

Other Embodiments

In another aspect, software breakpoints can be placed not directly where the unsafe instruction is, but at the safe instruction located just before the group of unsafe instructions, or after this group. The VMM then takes control due to an exception and bypasses this group of unsafe instructions or otherwise "corrects" their behavior. This can be achieved without software breakpoints by using natural exceptions in guest code and/or using simulated exceptions of VM context adjusting.

There are at least two ways of raising an exception during execution of potentially unsafe instructions. The first method involves placing software breakpoints (INT 1, INT 3, INT (n)), hardware breakpoints (DR0-DR3) and JMP stubs, as described above. The second method involves adjusting VM context using privilege levels, segment protection, page protection and processor system registers to raise an exception during execution of the particular potentially unsafe instruction. The second method can be used both separately and in combination with the first method.

Note also that there are two different ways to execute guest OS code. First, it can be executed with or without breakpoints. Second, a copy of the original code can be executed, with breakpoints and stubs. In the second case, a target code copy is placed at different linear addresses. However, all relative addresses remain the same, and the code segment (CS) base adjustment is used to achieve exactly the same effective address (EIP) for each target instruction.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for running a virtual machine in a computing system, comprising:
   (a) launching a virtual machine monitor (VMM) that uses a software debugger;

(b) launching a virtual machine (VM) that can natively run safe instructions;

(c) determining, at runtime, if the instruction is safe or potentially unsafe and (i) adjusting a context of the VM to enter an exception state during attempts to execute the potentially unsafe instructions, (ii) analyzing, at runtime and while running the control logic, a context of the VM and a set of previously executed instructions, and (iii) correcting a state of the VM if the state of the VM was damaged by a potentially unsafe instruction from a set of previously executed instructions;

(d) executing the safe instructions in a native mode of the VM; and (e) activating control logic to process potentially unsafe instructions in the software debugger.

2. The method of claim 1, further comprising:

(f) bypassing at least one potentially unsafe instruction.

3. The method of claim 2, wherein step (f) further comprises:

generating bypassing code for the at least one potentially unsafe instruction; and executing the bypassing code.

4. The method of claim 2, wherein step (f) further comprises:

transferring control to the VM after processing the at least one potentially unsafe instruction in the VMM; and restarting the at least one potentially unsafe instruction when that potentially unsafe instruction is safe in a current context of the VM.

5. The method of claim 2, wherein step (f) further comprises:

using the VMM, adjusting a current context of the VM to ensure safe execution of the at least one potentially unsafe instruction in the VM;

transferring control from the VMM to the VM; and executing the at least one potentially unsafe instruction in the adjusted context of the VM.

6. The method of claim 1, wherein step (c) comprises analyzing the instruction prior to its execution.

7. The method of claim 1, wherein step (c) comprises analyzing, at runtime and while running the control logic, a context of the VM to predict if a set of instructions to be executed in the future contains a potentially unsafe instruction.

8. A method for running a virtual machine in a computing system, comprising:

(a) launching a virtual machine monitor (VMM) that uses a software debugger;

(b) launching a virtual machine (VM) that can natively run safe instructions;

(c) executing the safe instructions in a native mode of the VM;

(d) activating control logic to process potentially unsafe instructions in the software debugger;

(e) analyzing a source page of guest code to identify the potentially unsafe instructions;

(f) determining, at runtime, if the instruction is safe or potentially unsafe;

(g) generating a target page of the guest code with breakpoints replacing the potentially unsafe instructions;

(h) executing instructions of the target page in a context of the VM;

(i) grouping the target Pages in a frame;

(j) executing intra-frame transfers of control in the context of the VM; and (k) activating the software debugger to handle out-of-frame transfers of control.

9. The method of claim 8, wherein any of an INT1, INT3 and INT(n) interrupts are used as the breakpoints.

10. The method of claim 8, further comprising dynamically mapping each page of the frame used by guest OS as "present" in a page table entry (PTE).

11. The method of claim 10, further comprising representing the frame as a plurality of page directory entries (PDE) that reflect an area of guest linear address space.

12. The method of claim 8, wherein step (d) further comprises analyzing a plurality of pages of guest code to identify the potentially unsafe instructions;

grouping the analyzed pages in a plurality of analyzed frames;

mapping several analyzed frames simultaneously into guest address space;

executing transfers of control between the mapped frames in the context of the VM; and activating the software debugger to handle transfers of control between at least one mapped frame and at least one unmapped frame.

13. The method of claim 8, wherein step (d) further comprises:

mapping the target page to a frame; and establishing page protection on the corresponding source page to intercept attempts of the guest code to modify the corresponding source page.

14. The method of claim 13, further comprising, upon detecting an attempt by the guest code to modify corresponding source page by means of a page fault:

unmapping the target page from the frame;

marking the target page as "changed" in a target page cache; and removing protection from corresponding source page.

15. The method of claim 14, further comprising, when mapping into the frame a target page from target pages cache, if a page is marked as "changed" and if analyzed address area was affected by those changes:

removing the target page from the target page cache;

initializing a new target page; and starting analyzing routine.

16. The method of claim 15, further comprising, upon detecting an attempts by the guest code to modify a corresponding source page by means of page fault:

unmapping the target page from the frame;

removing the target page from the target page cache; and removing protection from corresponding source page.

17. The method of claim 8, wherein step (d) further comprises:

mapping a first page of analyzed guest code to a frame; and activating the software debugger by raising a page fault when an instruction of the first page attempts to transfer control to second page that is not mapped in the frame.

18. The method of claim 17, further comprising mapping the second page in the frame such that subsequent attempts to transfer control to the second page will not raise the page fault.

19. The method of claim 1, wherein step (e) further comprises transferring control to an exception handling routine of a guest operating system (OS) of the VM.

20. The method of claim 1, wherein step (e) further comprises transferring control to an exception handling routine of a host operating system (OS).

21. The method of claim 1, wherein step (e) further comprises transferring control to an exception handling routine of the VMM.

22. The method of claim 1, wherein step (e) further comprises:
- generating a target page filled with breakpoints;
- replacing the breakpoints in the target page with the safe instructions of a source page of guest code, with address offsets preserved; and
- executing instructions of the target page in a context of the VM.

23. The method of claim 1, wherein step (e) further comprises:
- generating a target page by replacing a potentially unsafe instruction of a source page of guest code with an instruction that calls a stub;
- executing instructions of the target page in the context of the VM;
- after calling the stub, determining whether the potentially unsafe instructions can be safely executed in the context of the VM; and
- activating the software debugger to handle the potentially unsafe instructions incapable of being safely executed in the context of the VM.

24. The method of claim 1, wherein step (e) further comprises resuming guest code execution if the unsafe instructions are safely executable in the context of the VM.

25. The method of claim 24, wherein the generating step further comprises replacing potentially unsafe instructions with any of an INT1, INT3 and INT(n) interrupts that calls the stub.

26. A method for running a virtual machine in a computing system, comprising:
- analyzing, at runtime, a source page of guest code to identify potentially unsafe instructions and (i) adjusting a context of the VM to enter an exception state during attempts to execute the potentially unsafe instructions, (ii) analyzing, at runtime and while running the control logic, a context of the VM and a set of previously executed instructions, and (iii) correcting a state of the VM if the state of the VM was damaged by a potentially unsafe instruction from a set of previously executed instructions;
- generating a target page of the guest code with breakpoints replacing the potentially unsafe instructions;
- transferring control from a virtual machine (VM) running the guest code to a software debugger of a virtual machine monitor (VMM) when an exception is raised at one of the breakpoints; and
- bypassing at least one potentially unsafe instruction.

27. A computing system for running a virtual machine, comprising:
- a virtual machine monitor (VMM) that uses a software debugger;
- a virtual machine (VM) that executes safe instructions in a native mode; and
- control logic that determines, at runtime, if the instruction is safe or potentially unsafe, and activates the software debugger in a VMM context to handle the potentially unsafe instructions, the control logic also (i) adjusting a context of the VM to enter an exception state during attempts to execute the potentially unsafe instructions, (ii) analyzing, at runtime and while running the control logic, a context of the VM and a set of previously executed instructions, and (iii) correcting a state of the VM if the state of the VM was damaged by a potentially unsafe instruction from a set of previously executed instructions
- wherein the software debugger bypasses at least one of the potentially unsafe instructions.

28. The system of claim 27, wherein the potentially unsafe instructions include instructions that cannot be safely executed in the context of the VM, and instructions that can cause unpredictable results in the context of the VM.

29. The system of claim 27, wherein the software debugger restarts execution of the at least one potentially unsafe instruction when that potentially unsafe instruction is safe in the context of the VM.

30. The system of claim 27, wherein the software debugger adjusts a current context of the VM to ensure safe execution of the at least one potentially unsafe instruction in the context of the VM.

31. The system of claim 27, wherein the control logic analyzes a source page of guest code to identify the potentially unsafe instructions, and generates a target page of the guest code, with breakpoints replacing the potentially unsafe instructions in the target page, and wherein the VM executes instructions of the target page.

32. The system of claim 31, wherein the breakpoints include any of an INT1, INT3, and INT(n) interrupt.

33. The system of claim 27, wherein opcodes that are invalid in the context of the VM activate the software debugger processing logic.

34. The system of claim 27, wherein the control logic includes at least one of a hardware control logic and a software control logic.

35. The system of claim 27, further comprising an exception handler that bypasses the potentially unsafe instructions.

36. The system of claim 35, wherein the exception handler is executed in the VM context.

37. The system of claim 35, wherein the exception handler is executed in the VMM context.

38. A computing system for running a virtual machine, comprising:
- a virtual machine monitor (VMM) that uses a software debugger;
- a virtual machine (VM) that directly executes safe instructions; and
- control logic that switches, at runtime to the software debugger for handling potentially unsafe instructions, and switches to direct execution to natively execute the safe instructions,
- wherein the control logic (i) analyzes a source page of guest code to identify the potentially unsafe instructions; (ii) generates a target page of the quest code with breakpoints replacing the potentially unsafe instructions; (iii) executes instructions of the target page in a context of the VM;
- (iv) groups the target pages in a frame;
- (v) executes intra-frame transfers of control in the context of the VM; and
- (vi) activates the software debugger to handle out-of-frame transfers of control.

39. A computer program product for running a virtual machine in a computing system, the computer program product comprising a computer useable medium having computer program logic recorded thereon for controlling at least one processor, the computer program logic comprising:
- computer program code means for launching a virtual machine monitor (VMM) that uses a software debugger;
- computer program code means for launching a virtual machine (VM) that can natively run safe instructions;
- computer program code means for determining, at runtime, if the instruction is safe or potentially unsafe and (i) adjusting a context of the VM to enter an exception state during attempts to execute the potentially unsafe instructions, (ii) analyzing at runtime and while running the control logic, a context of the VM and a set of previously executed instructions, and (iii) correcting a state of the VM if the state of the VM was damaged by a potentially unsafe instruction from a set of previously executed instructions;

computer program code means for executing the safe instructions in a native mode of the VM; and computer program code means for activating control logic to process potentially unsafe instructions in the software debugger.

40. A method for running a virtual machine in a computing system, comprising:

analyzing, at runtime, a source page of guest code to identify potentially unsafe instructions;

generating a target page of the guest code with breakpoints replacing the potentially unsafe instructions;

executing instructions of the target page in a context of the VM;

transferring control from a virtual machine (VM) running the guest code to a software debugger of a virtual machine monitor (VMM) when an exception is raised at one of the breakpoints;

grouping the target pages in a frame;

executing intra-frame transfers of control in the context of the VM;

activating the software debugger to handle out-of-frame transfers of control; and bypassing at least one potentially unsafe instruction.

41. A computing system for running a virtual machine, comprising:

a virtual machine monitor (VMM) that uses a software debugger;

a virtual machine (VM) that executes safe instructions in a native mode; and control logic that determines, at runtime, if the instruction is safe or potentially unsafe, and activates the software debugger in a VMM context to handle the potentially unsafe instructions, wherein the control logic (i) analyzes a source page of guest code to identify the potentially unsafe instructions;

(ii) generates a target page of the guest code with breakpoints replacing the potentially unsafe instructions;

(iii) executes instructions of the target page in a context of the VM;

(iv) groups the target pages in a frame;

(v) executes intra-frame transfers of control in the context of the VM; and (vi) activates the software debugger to handle out-of-frame transfers of control, and wherein the software debugger bypasses at least one of the potentially unsafe instructions.

42. A computing system for running a virtual machine, comprising:

a virtual machine monitor (VMM) that uses a software debugger;

a virtual machine (VM) that directly executes safe instructions; and control logic that switches, at runtime to the software debugger for handling potentially unsafe instructions, and switches to direct execution to natively execute the safe instructions, wherein the control logic (i) analyzes a source page of guest code to identify the potentially unsafe instructions;

(ii) generates a target page of the guest code with breakpoints replacing the potentially unsafe instructions;

(iii) executes instructions of the target page in a context of the VM;

(iv) groups the target pages in a frame;

(v) executes intra-frame transfers of control in the context of the VM; and (vi) activates the software debugger to handle out-of-frame transfers of control.

43. A computer program product for running a virtual machine in a computing system, the computer program product comprising a computer useable medium having computer program logic recorded thereon for controlling at least one processor, the computer program logic comprising:

computer program code means for launching a virtual machine monitor (VMM) that uses a software debugger;

computer program code means for launching a virtual machine (VM) that can natively run safe instructions;

computer program code means for determining, at runtime, if the instruction is safe or potentially unsafe;

computer program code means for executing the safe instructions in a native mode of the VM; and computer program code means for activating control logic to process potentially unsafe instructions in the software debugger, wherein the control logic (i) analyzes a source page of guest code to identify the potentially unsafe instructions;

(ii) generates a target page of the guest code with breakpoints replacing the potentially unsafe instructions;

(iii) executes instructions of the target page in a context of the VM;

(iv) groups the target pages in a frame;

(v) executes intra-frame transfers of control in the context of the VM; and (vi) activates the software debugger to handle out-of-frame transfers of control.

* * * * *